(12) United States Patent
Pantelidou et al.

(10) Patent No.: US 8,879,422 B2
(45) Date of Patent: Nov. 4, 2014

(54) FAIRNESS PROVISION VIA CONTROLLING A TRANSMISSION OPPORTUNITY WINDOW IN A WIRELESS MESH NETWORK

(75) Inventors: Anna Pantelidou, Oulu (FI); Timo Koskela, Oulu (FI); Sami-Jukka Hakola, Kempele (FI); Samuli Turtinen, Ii (FI)

(73) Assignee: Broadcom Corporation, Irvine, CA (US)

( * ) Notice: Subject to any disclaimer, the term of this patent is extended or adjusted under 35 U.S.C. 154(b) by 394 days.

(21) Appl. No.: 13/351,537

(22) Filed: Jan. 17, 2012

(65) Prior Publication Data

US 2013/0182610 A1    Jul. 18, 2013

(30) Foreign Application Priority Data

Jan. 13, 2012    (GB) .................................. 1200562.5

(51) Int. Cl.
*H04L 12/28*    (2006.01)
*H04W 74/08*    (2009.01)
*H04W 84/18*    (2009.01)

(52) U.S. Cl.
CPC .............. *H04W 74/08* (2013.01); *H04W 84/18* (2013.01)
USPC ............................ 370/254; 370/310; 370/431

(58) Field of Classification Search
None
See application file for complete search history.

(56) References Cited

U.S. PATENT DOCUMENTS

| | | | | |
|---|---|---|---|---|
| 6,446,122 | B1 * | 9/2002 | Rawat et al. .................. | 709/224 |
| 2006/0262737 | A1 * | 11/2006 | Livet et al. .................... | 370/254 |
| 2007/0214379 | A1 * | 9/2007 | Abraham et al. .................. | 714/4 |
| 2008/0285507 | A1 * | 11/2008 | Mukherjee et al. ........... | 370/329 |
| 2010/0182929 | A1 * | 7/2010 | Abraham et al. ............. | 370/252 |
| 2011/0280197 | A1 * | 11/2011 | Brueck et al. ................ | 370/329 |
| 2012/0023265 | A1 * | 1/2012 | Liao ................................. | 710/5 |
| 2012/0026910 | A1 * | 2/2012 | Ko et al. ....................... | 370/252 |

FOREIGN PATENT DOCUMENTS

| | | |
|---|---|---|
| WO | WO 2007/047756 A1 | 4/2007 |
| WO | WO 2007/103891 A2 | 9/2007 |
| WO | WO 2007/103891 A3 | 9/2007 |
| WO | WO 2009/136749 A2 | 11/2009 |

OTHER PUBLICATIONS

UK IPO Search Report under Section 17 dated May 21, 2012 issued in a related British Application No. GB 1200562.5 (1 page).
EunKyung Kim et al., "ATXOP: An Adaptive Live TXOP Based on the Data Rate to Guarantee Fairness for IEEE 802.11e Wireless LANs," IEEE 60$^{th}$ Vehicular Technology Conference Fall 2004, VTC2004—Fall, Sep. 26-29, 2004, vol. 4, pp. 2678-2682.

(Continued)

*Primary Examiner* — Phirin Sam
*Assistant Examiner* — Peter Chau
(74) *Attorney, Agent, or Firm* — Foley & Lardner LLP

(57) ABSTRACT

The invention allows fairness provision in wireless mesh networks with respect to the data rate that stations communicate. A fairness metric is obtained during a mesh profile negotiation performed in order for a wireless station to join a wireless mesh network. Predetermined mesh transmission parameters of the wireless station are sent to previously joined wireless stations in a predetermined neighborhood of the wireless station. From the previously joined wireless stations their respective predetermined mesh transmission parameters are received. In response to a first predetermined event, a transmission opportunity window is determined for the wireless station based on the obtained fairness metric, the predetermined mesh transmission parameters of the wireless station, and the predetermined mesh transmission parameters of the previously joined wireless stations.

19 Claims, 2 Drawing Sheets

(56) References Cited

OTHER PUBLICATIONS

EunKyung Kim et al., "A Rate Adaptive Transmission Opportunity for Fairness over IEEE 802.11e Wireless LANs," IEEE International Conference on Communications 2007, Jun. 24-28, 2007, Glasgow, UK, pp. 4523-4528.

Hui Ma et al., "Contention Window and Transmission Opportunity Adaptation for Dense IEEE 802.11 WLAN Based on Loss Differentiation," IEEE International Conference on Communications 2008, May 19, 2008, Piscataway, NJ, US, pp. 2556-2560.

Section 8.4.2.31 & Section 9.19 HCF of IEEE Draft P802.11-REVmb/D8.01, May 2011, "IEEE Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications" prepared by the 802.11 Working Group of the LAN/MAN Standards Committee of the IEEE Computer Society, May 2011, pp. 587-580 & pp. 990-1009, repectively.

\* cited by examiner

FAIRNESS PROVISION VIA CONTROLLING A TRANSMISSION OPPORTUNITY WINDOW IN A WIRELESS MESH NETWORK

CROSS-REFERENCE TO RELATED APPLICATION

This application is based upon and claims the benefit of priority under 35 USC 119 of UK Patent Application No. 1200562.5 filed on Jan. 13, 2012, the entire contents of which are incorporated herein by reference.

BACKGROUND OF THE INVENTION

1. Field of the Invention

The invention relates generally to wireless communications. In particular, the invention relates to fairness provision via controlling a transmission opportunity window in a wireless mesh network.

2. Description of the Related Art

Various wireless mesh network technologies have recently emerged providing dynamic and cost effective connectivity over a given geographic area. A wireless mesh network is a communications network consisting of radio nodes organized in a mesh topology. Wireless mesh networks often consist of mesh clients, mesh routers and gateways. The mesh clients may be e.g., laptops, cell phones, and other wireless devices while the mesh routers forward traffic to and from the gateways which may, but need not, connect to the Internet. A mesh network is reliable and offers redundancy. If one node can no longer operate, the rest of the nodes can still communicate with each other, directly or through one or more intermediate nodes.

One of the wireless mesh network technologies is IEEE 802.11s which is an extension to IEEE 802.11 set of standards for implementing a wireless local area network (WLAN). Another wireless mesh network technology involves ad hoc device-to-device (D2D) communication in cellular networks but without cellular coverage.

A transmission opportunity (TROP) window may be used in wireless mesh networks as a basic unit of allocation of the right to transmit onto the wireless medium, i.e., a transmission opportunity window is the interval of time when a station has the right to initiate its transmission. During a single transmission opportunity window, a station can trans-mit several frames without any contentions with other stations or without any additional polling from an access point (AP). The transmission opportunity window allows a station to transmit a multitude of frames one after another, as long as all the frame transmissions occur within the duration of the current transmission opportunity window.

However, there is a serious disadvantage in current implementations of the transmission opportunity in that, while the transmission opportunity window can be different depending on the traffic class of the corresponding packets, within frames of the same class the transmission opportunity window is identical, regardless of data transmission rate capabilities of the respective station. That is, the current implementations of the transmission opportunity provide fairness with respect to the time each stations accesses the wireless medium but not with respect to data rate that each station communicates.

Therefore, an object of the present invention is to alleviate the problems described above and to introduce a solution that allows fairness provision in wireless mesh networks with respect to the data rate that stations communicate.

SUMMARY OF THE INVENTION

A first aspect of the present invention is a method of fairness provision via controlling a transmission opportunity window, in which a fairness metric is obtained during a mesh profile negotiation performed in order for a wireless station to join a wireless mesh network. Predetermined mesh transmission parameters of the wireless station are sent to previously joined wireless stations in a predetermined neighborhood of the wireless station. From the previously joined wireless stations in the predetermined neighborhood of the wireless station their respective predetermined mesh transmission parameters are received. In response to a first predetermined event, a transmission opportunity window is determined for the wireless station based on the obtained fairness metric, the predetermined mesh transmission parameters of the wireless station, and the predetermined mesh transmission parameters of the previously joined wireless stations.

A second aspect of the present invention is a wireless station adapted to communicate with a wireless mesh network. The wireless station comprises a first negotiation unit configured to obtain a fairness metric during a mesh profile negotiation performed in order for a wireless station to join the wireless mesh network. The wireless station further comprises a second negotiation unit configured to send predetermined mesh transmission parameters of the wireless station to previously joined wireless stations in a predetermined neighborhood of the wireless station, and to receive from the previously joined wireless stations in the predetermined neighborhood of the wireless station their respective predetermined mesh transmission parameters. The wireless station further comprises a controller configured to determine a transmission opportunity window for the wireless station based on the obtained fairness metric, the predetermined mesh transmission parameters of the wireless station, and the predetermined mesh transmission parameters of the previously joined wireless stations, in response to a first predetermined event.

A third aspect of the present invention is a computer program for fairness provision via controlling a transmission opportunity window, the computer program comprising code adapted to perform the following steps, when executed on a data-processing system:

obtaining a fairness metric during a mesh profile negotiation performed in order for a wireless station to join a wireless mesh network;

sending predetermined mesh transmission parameters of the wireless station to previously joined wireless stations in a predetermined neighborhood of the wireless station;

receiving the predetermined mesh transmission parameters from the previously joined wireless stations in the predetermined neighborhood of the wireless station; and in response to a first predetermined event, determining a transmission opportunity window for the wireless station based on the obtained fairness metric, the predetermined mesh transmission parameters of the wireless station, and the predetermined mesh transmission parameters of the previously joined wireless stations.

A fourth aspect of the present invention is a wireless station adapted to communicate with a wireless mesh network. The wireless station comprises a first negotiation means for obtaining a fairness metric during a mesh profile negotiation performed in order for a wireless station to join the wireless mesh network. The wireless station further comprises a second negotiation means for sending predetermined mesh transmission parameters of the wireless station to previously joined wireless stations in a predetermined neighborhood of the wireless station, and for receiving from the previously joined wireless stations in the predetermined neighborhood of the wireless station their respective predetermined mesh transmission parameters. The wireless station further comprises a control means for determining a transmission opportunity window for the wireless station based on the obtained fairness metric, the predetermined mesh transmission parameters of the wireless station, and the predetermined mesh transmission parameters of the previously joined wireless stations, in response to a first predetermined event.

In an embodiment of the invention, the predetermined mesh transmission parameters comprise at least one of a last used modulation scheme, a last used coding scheme, a last used transmission opportunity window and a currently communicated average data rate.

In an embodiment of the invention, in response to one of the first predetermined event and a subsequent predetermined event, or in response to a request from one or more previously joined wireless station, and if at least one of the last used modulation scheme, the last used coding scheme, and one of the currently communicated average data rate and the transmission opportunity window of the wireless station has changed, the previously joined wireless stations in the predetermined neighborhood are re-informed about the change.

In an embodiment of the invention, in response to one of the first predetermined event and the subsequent predetermined event: the previously joined wireless stations in the predetermined neighborhood are requested to re-send their respective mesh transmission parameters for use in determining the transmission opportunity window for the wireless station, or average values of the mesh transmission parameters are utilized in determining the transmission opportunity window for the wireless station.

In an embodiment of the invention, the first predetermined event and the subsequent predetermined event comprise at least one of a scheduling decision to be made and the wireless station having data to send.

In an embodiment of the invention, the predetermined neighborhood comprises the previously joined wireless stations within N hops from the wireless station, in which N≥1.

In an embodiment of the invention, the transmission opportunity window has a predetermined maximum duration.

In an embodiment of the invention, the information about the last used modulation scheme, the last used coding scheme, and one of the currently communicated average data rate and the transmission opportunity window is broadcast, e.g. in beacon messages.

In an embodiment of the invention, the fairness metric is the fairness metric is related to a rate-dependent parameter.

In an embodiment of the invention, the computer program of the third aspect is stored on a computer readable medium.

It is to be understood that the aspects and embodiments of the invention described above may be used in any combination with each other. Several of the aspects and embodiments may be combined together to form a further embodiment of the invention. A method, a wireless station, or a computer program which is an aspect of the invention may comprise at least one of the embodiments of the invention described above.

The invention allows fairness provision in wireless mesh networks with respect to the data rate that stations communicate. Furthermore, the arrangement of the invention is efficient and avoids system degradation, e.g., in cases where one link is a bottleneck. Furthermore, the invention allows maintaining existing back-off mechanisms.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
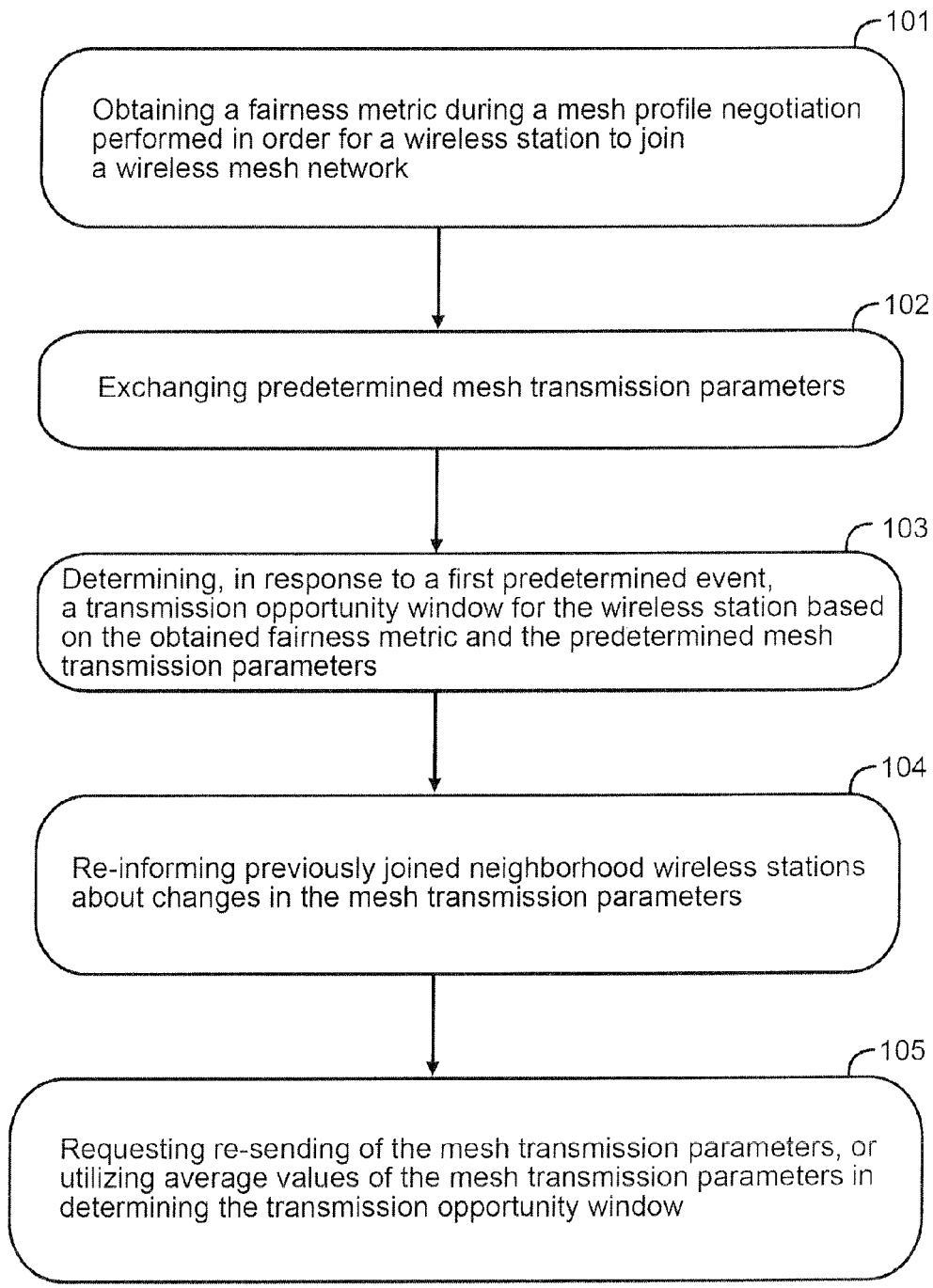
FIG. 1 is a flow diagram illustrating a method according to an embodiment of the invention.

FIG. 1 is a flow diagram illustrating a method of fairness provision via controlling a transmission opportunity window according to an embodiment of the present invention.

At step 101, a fairness metric is obtained during a mesh profile negotiation performed in order for a wireless station to join a wireless mesh network. The wireless mesh network may comprise, e.g., an IEEE 802.11s based wireless mesh network and/or an ad hoc device-to-device (D2D) communication in a cellular network without cellular coverage. The fairness metric may be related to a rate-dependent parameter, such as at least one of average, minimum, and maximum data rate of the wireless stations in the predetermined neighborhood. The fairness metric can be part of the mesh profile (if it is not allowed to change in the course of time) or can be a separate parameter that is negotiated along with the mesh profile.

At step 102, predetermined mesh transmission parameters of the wireless station are sent to previously joined wireless stations in a predetermined neighborhood of the wireless station. Also, from the previously joined wireless stations in the predetermined neighborhood of the wireless station their respective predetermined mesh transmission parameters are received. It is to be understood that the above mesh transmission parameters may be first sent and then received, or first received and then sent. The predetermined mesh transmission parameters may comprise at least one of a last used modulation scheme, a last used coding scheme, a last used transmission opportunity window and a currently communicated average data rate.

The above steps 101-102 relate to the negotiation process that is performed in response to a wireless station intending to join a wireless mesh network. In such a negotiation process, other previously known parameters may also be negotiated, as is known in the art. For example, in the case of an IEEE 802.11s based wireless mesh network, a mesh ID, a path selection protocol, and a path selection metric may be negotiated. In other words, the steps 101-102 of the invention may be implemented into such an existing negotiation process.

Once the mesh is created, the last modulation and coding scheme are communicated through all members of the mesh. From the original average rate at the time of joining and the modulation and coding scheme, each station in the mesh can compute the average rate of all stations in the mesh whenever needed. This can be computed offline.

At step 103, in response to a first predetermined event, a transmission opportunity window is determined for the wireless station based on the obtained fairness metric (e.g. Jain index, proportional fairness, or weighted fairness), the predetermined mesh transmission parameters of the wireless station, and the predetermined mesh transmission parameters of the previously joined wireless stations. For example, for proportional fairness, the target may be to maximize the sum of the ratios of instantaneous to average rates over all users and the transmission opportunity window duration can be controlled accordingly to satisfy this objective by affecting the average rates.

At step 104, in response to one of the first predetermined event and a subsequent predetermined event, or in response to a request from one or more previously joined wireless station, and if at least one of the last used modulation scheme, the last used coding scheme, and one of the currently communicated average data rate and the transmission opportunity window of the wireless station has changed, the previously joined wireless stations in the predetermined neighborhood are re-informed about the change.

At step 105, in response to one of the first predetermined event and the subsequent predetermined event: the previously joined wireless stations in the predetermined neighborhood are requested to re-send their respective mesh transmission parameters for use in determining the transmission opportunity window for the wireless station, or average values of the mesh transmission parameters are utilized in determining the transmission opportunity window for the wireless station.

The first predetermined event and the subsequent predetermined event may comprise, e.g., one of a scheduling decision to be made and the wireless station having data to send. Typically, there is no need to re-communicate the fairness index after the wireless mesh network parameter negotiation since it is typically a more stable parameter that does not change. However, if it changes, it may be sent along the other parameters.

Accordingly, a wireless station does not exchange any information, e.g., if it has an empty buffer, or if its previous parameters in terms of average rate and modulation and coding scheme remain the same. This allows reducing potentially unnecessary information exchange overhead.

The predetermined neighborhood may comprise the previously joined wireless stations within N hops from the wireless station, in which N≥1. Accordingly, information may be gathered from all stations in the N-hop neighborhood of a station. The larger the distance N is, the more accurate the scheduling will be, at the expense of a higher overhead. The value of N may be controlled and selected according to e.g., the traffic statistics and network density. However, the present invention is not limited to these. N=1 is a more specific case and is also allowed—here information only from the direct one-hop neighbors is obtained. Typically one hop neighborhood consists of nodes inside the collision domain of the transmitter, but the invention is not limited to this (for example, there may be multiple hops inside the collision domain).

The transmission opportunity window may have a predetermined maximum duration beyond which a wireless station has to release the medium to avoid access monopoly by one station. Contention may occur according to a random back-off algorithm, but once a station obtains access to the wireless medium, it may keep it for as long as needed to maintain fairness. Thus, the transmission opportunity window may be computed at each wireless station.

The notion of fairness may be decided beforehand among the stations. The fairness metric may comprise e.g., Jain index, proportional fairness, or weighted fairness. These are all known in the art, and therefore are not described in more detail herein.

The information about the last used modulation scheme, the last used coding scheme, and one of the currently communicated average data rate and the transmission opportunity window may be broadcast, e.g. in beacon messages thereby allowing all stations in a given neighborhood to have complete information of each other's average communicated rates and modulation and coding schemes.

The fairness metric may be included in a mesh profile. Thus, in one implementation the "Mesh Profile" may comprise at least a mesh ID, a path selection protocol, a path selection metric, and a fairness metric. If a wireless station wishes to join the wireless mesh network, but uses a different fairness metric, it should revert its metric to the metric used by the wireless mesh network. Here, a similar process like the existing method when the path selection protocol or metric used by the wireless station is different from the corresponding values of the mesh profile may be used, for example.

Figure 2:
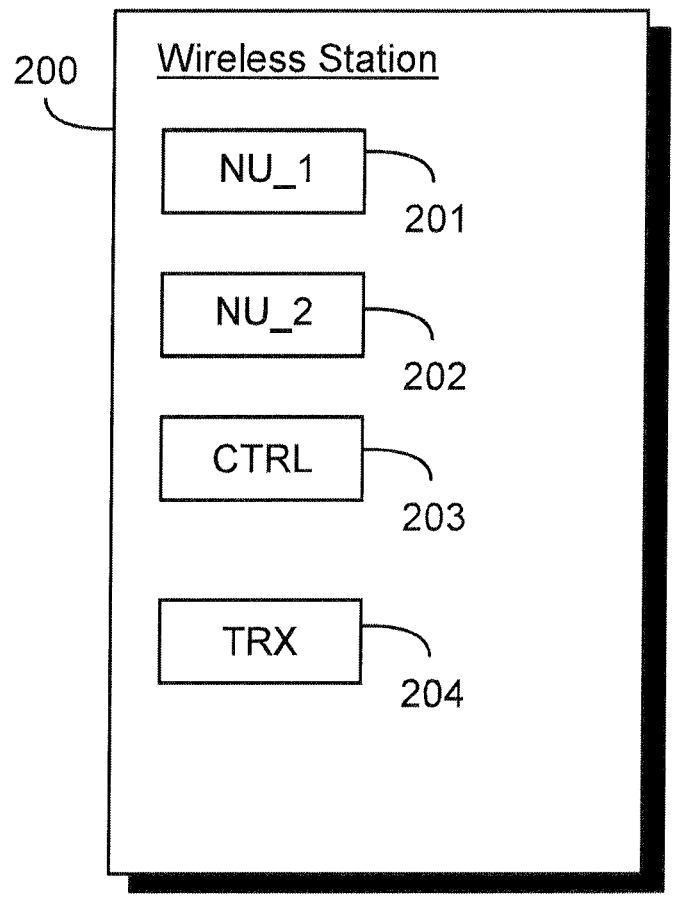
FIG. 2 is a block diagram illustrating a wireless station according to an embodiment of the invention.

FIG. 2 is a block diagram illustrating a wireless station 200 adapted to communicate with a wireless mesh network (not illustrated) according to an embodiment of the present invention. The wireless station 200 may comprise e.g. a laptop, a cell phone or some other wireless device. The wireless station 200 comprises a first negotiation unit 201 that is configured to obtain a fairness metric during a mesh profile negotiation performed in order for a wireless station 200 to join the wireless mesh network. The wireless station 200 further comprises a second negotiation unit 202 that is configured to send predetermined mesh transmission parameters of the wireless station 200 to previously joined wireless stations (not illustrated) in a predetermined neighborhood of the wireless station 200, and to receive from the previously joined wireless stations in the predetermined neighborhood of the wireless station 200 their respective predetermined mesh transmission parameters. The wireless station 200 further comprises a controller 203 that is configured to determine a transmission opportunity window for the wireless station 200 based on the obtained fairness metric, the predetermined mesh transmission parameters of the wireless station, and the predetermined mesh transmission parameters of the previously joined wireless stations, in response to a first predetermined event.

As mentioned above, the fairness metric may be related to a rate-dependent parameter, and the predetermined mesh transmission parameters may comprise at least one of a last used modulation scheme, a last used coding scheme, a last used transmission opportunity window and a currently communicated average data rate.

The wireless station 200 may further comprise a re-transmission unit 204 that is configured to, in response to one of the first predetermined event and the subsequent predetermined event, or in response to a request from one or more previously joined wireless station, and if at least one of the last used modulation scheme, the last used coding scheme, and one of the currently communicated average data rate and the transmission opportunity window of the wireless station has changed, re-inform the previously joined wireless stations in the predetermined neighborhood about the change.

The controller 203 may be further configured to, in response to one of the first predetermined event and the subsequent predetermined event: request the previously joined wireless stations in the predetermined neighborhood to re-send their respective mesh transmission parameters for use in determining the transmission opportunity window for the wireless station 200, or utilize average values of the mesh transmission parameters in determining the transmission opportunity window for the wireless station 200.

The exemplary embodiments can include, for example, any suitable laptop computers, Internet appliances, handheld devices, cellular telephones, smart phones, wireless devices, and the like, capable of performing the processes of the exemplary embodiments. The devices and subsystems of the exemplary embodiments can communicate with each other using any suitable protocol and can be implemented using one or more programmed computer systems or devices.

Embodiments of the present invention may be implemented in software, hardware, application logic or a combination of software, hardware and application logic. In an example embodiment, the application logic, software or instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electro-magnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

If desired, the different functions discussed herein may be performed in a different order and/or concurrently with each other.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method of fairness provision via controlling a transmission opportunity window, comprising:
   obtaining a fairness metric during a mesh profile negotiation performed in order for a wireless station to join a wireless mesh network;
   sending predetermined mesh transmission parameters comprising a currently communicated average data rate and a last used transmission opportunity window of the wireless station to previously joined wireless stations in a predetermined neighborhood of the wireless station;
   receiving from the previously joined wireless stations in the predetermined neighborhood of the wireless station their respective predetermined mesh transmission parameters comprising a currently communicated average data rate and a last used transmission opportunity window of the respective wireless station; and
   in response to a first predetermined event, determining a transmission opportunity window for the wireless station based on the obtained fairness metric, the predetermined mesh transmission parameters of the wireless station, and the predetermined mesh transmission parameters of the previously joined wireless stations, and based on maximizing a sum of ratios of an instantaneous data rate and the currently communicated average data rate for each wireless station.

2. The method according to claim 1, wherein the predetermined mesh transmission parameters sent to previously joined wireless stations comprise at least one of a last used modulation scheme, a last used coding scheme, a last used transmission opportunity window and a currently communicated average data rate.

3. The method according to claim 1, further comprising:
in response to one of the first predetermined event and a subsequent predetermined event, or in response to a request from one or more previously joined wireless station, and if at least one of a last used modulation scheme, a last used coding scheme, and one of a currently communicated average data rate and the transmission opportunity window of the wireless station has changed, re-informing the previously joined wireless stations in the predetermined neighborhood about the change.

4. The method according to claim 3, further comprising:
in response to one of the first predetermined event and the subsequent predetermined event:
utilizing average values of the predetermined mesh transmission parameters received from the previously joined wireless stations in determining the transmission opportunity window for the wireless station.

5. The method according to claim 3, wherein the first predetermined event and the subsequent predetermined event comprise at least one of a scheduling decision to be made and the wireless station having data to send.

6. The method according to claim 1, wherein the predetermined neighborhood comprises the previously joined wireless stations within N hops from the wireless station, in which $N \geq 1$.

7. The method according to claim 1, wherein the transmission opportunity window has a predetermined maximum duration.

8. The method according to claim 1, wherein sending the predetermined mesh transmission parameters to previously joined wireless stations comprises broadcasting the predetermined mesh transmission parameters.

9. The method according to claim 1, wherein the fairness metric is related to a rate-dependent parameter.

10. A wireless station adapted to communicate with a wireless mesh network, the wireless station comprising:
a first negotiation unit configured to obtain a fairness metric during a mesh profile negotiation performed in order for a wireless station to join the wireless mesh network;
a second negotiation unit configured to send predetermined mesh transmission parameters comprising a currently communicated average data rate and a last used transmission opportunity window of the wireless station to previously joined wireless stations in a predetermined neighborhood of the wireless station, and to receive from the previously joined wireless stations in the predetermined neighborhood of the wireless station their respective predetermined mesh transmission parameters comprising a currently communicated average data rate and a last used transmission opportunity window of the respective wireless station; and
a controller configured to determine a transmission opportunity window for the wireless station based on the obtained fairness metric, the predetermined mesh transmission parameters of the wireless station, and the predetermined mesh transmission parameters of the previously joined wireless stations, and based on maximizing a sum of ratios of an instantaneous data rate and the currently communicated average data rate for each wireless station, in response to a first predetermined event.

11. The wireless station according to claim 10, wherein the predetermined mesh transmission parameters sent to previously joined wireless stations comprise at least one of a last used modulation scheme, a last used coding scheme, a last used transmission opportunity window and a currently communicated average data rate.

12. The wireless station according to claim 10, further comprising:
a re-transmission unit configured to, in response to one of the first predetermined event and a subsequent predetermined event, or in response to a request from one or more previously joined wireless station, and if at least one of a last used modulation scheme, a last used coding scheme, and one of a currently communicated average data rate and the transmission opportunity window of the wireless station has changed, re-inform the previously joined wireless stations in the predetermined neighborhood about the change.

13. The wireless station according to claim 12, wherein the controller is further configured to, in response to one of the first predetermined event and the subsequent predetermined event, or in response to a request:
utilize average values of the predetermined mesh transmission parameters received from the previously joined wireless stations in determining the transmission opportunity window for the wireless station.

14. The wireless station according to claim 12, wherein the first predetermined event and the subsequent predetermined event comprise at least one of a scheduling decision to be made and the wireless station having data to send.

15. The wireless station according to claim 10, wherein the predetermined neighborhood comprises the previously joined wireless stations within N hops from the wireless station, in which $N \geq 1$.

16. The wireless station according to claim 10, wherein the transmission opportunity window has a predetermined maximum duration. wireless station.

17. The wireless station according to claim 10, wherein the predetermined mesh transmission parameters sent to previously joined wireless stations are sent via broadcast.

18. The wireless station according to claim 10, wherein the fairness metric is related to a rate-dependent parameter.

19. A non-transitory computer readable medium comprising a computer program for fairness provision via controlling a transmission opportunity window, the computer program comprising code configured to, when executed on a data-processing system, cause the data-processing system to:
obtain a fairness metric during a mesh profile negotiation performed in order for a wireless station to join a wireless mesh network;
send predetermined mesh transmission parameters comprising a currently communicated average data rate and a last used transmission opportunity window of the wireless station to previously joined wireless stations in a predetermined neighborhood of the wireless station;
receive, from each of the previously joined wireless stations in the predetermined neighborhood of the wireless station, predetermined mesh transmission parameters comprising a currently communicated average data rate and a last used transmission opportunity window of the respective wireless station; and
in response to a first predetermined event, determine a transmission opportunity window for the wireless station based on the obtained fairness metric, the predetermined mesh transmission parameters of the wireless station, and the predetermined mesh transmission parameters of the previously joined wireless stations, and based on maximizing a sum of ratios of an instantaneous data rate and the currently communicated average data rate for each wireless station.

* * * * *